United States Patent [19]

Hudson

[11] Patent Number: 4,876,918
[45] Date of Patent: Oct. 31, 1989

[54] HIGH SPEED DIFFERENTIAL UNIT

[76] Inventor: John L. Hudson, Rte. 1, Florence, S.C. 29501

[21] Appl. No.: 217,615

[22] Filed: Jul. 11, 1988

[51] Int. Cl.⁴ .................... F16D 41/06; F16H 35/04
[52] U.S. Cl. .................................... 74/650; 192/50
[58] Field of Search .................. 74/650, 664; 192/50

[56] References Cited

U.S. PATENT DOCUMENTS

| | | | |
|---|---|---|---|
| 898,175 | 9/1908 | Belt | 192/50 |
| 906,017 | 12/1908 | Hedgeland | 192/50 X |
| 993,563 | 5/1911 | Stanley | 192/50 |
| 997,585 | 7/1911 | Stanley | 192/50 |
| 1,162,754 | 12/1915 | Deegan | 74/650 |
| 1,232,244 | 7/1917 | Dick | 192/50 |
| 1,238,659 | 8/1917 | Ford | 74/650 |
| 1,282,614 | 10/1918 | Miller | 74/650 |
| 1,313,247 | 8/1919 | Bailey | 74/650 |
| 1,692,531 | 11/1928 | Abramson | 74/650 |
| 1,823,092 | 9/1931 | De Lavaud | 74/650 |
| 1,869,154 | 7/1932 | King | 74/650 |
| 1,902,449 | 3/1933 | Hughes | 74/650 |
| 1,946,358 | 2/1934 | Prosche et al. | 74/650 |
| 2,139,405 | 12/1938 | Frederickson | 74/650 |
| 2,150,312 | 3/1939 | Barnes | 74/650 |
| 2,191,763 | 2/1940 | LaCasse | 74/650 |
| 2,338,215 | 1/1944 | Summy | 74/650 |
| 2,651,214 | 7/1950 | Randall | 74/650 |
| 2,729,118 | 1/1956 | Emslie | 74/650 |
| 2,841,036 | 7/1958 | Decker | 74/650 |
| 2,938,407 | 5/1960 | Nallinger et al. | 74/650 |
| 2,967,438 | 1/1961 | Altmann | 74/650 |
| 3,130,604 | 4/1964 | Johnson et al. | 74/650 |
| 3,283,611 | 11/1966 | Weismann et al. | 74/650 |
| 3,700,082 | 10/1972 | Schwab | 74/650 X |
| 3,935,753 | 2/1976 | Williams | 74/650 |
| 4,561,518 | 12/1985 | Grinde | 74/650 |

FOREIGN PATENT DOCUMENTS 0391583 10/1924 Fed. Rep. of Germany ........ 74/650
0853884 6/1940 France ................................. 74/650

Primary Examiner—Leslie A. Braun
Assistant Examiner—William Gehris
Attorney, Agent, or Firm—Dority & Manning

[57] ABSTRACT

A differential drive unit has separate drive shafts extending from a housing. Respective drive plates for each shaft differentially receive rotational power from the housing as such housing rotates. Respective wedges transfer housing rotational power to the respective drive plates, upon engaging inside diameter portions of the housing. Such engagement forces the respective wedges down into contact and frictional engagement with one of the respective drive plates axially inward therefrom. The wedges are carried in circumferential slots defined through the circumference of a cage assembly, which includes an annular member located between the outside diameter of the drive plates and the inside diameter of the housing. Wedges within a given slot include a pair of wedge elements joined together with a spring under compression. Free-wheeling of a drive shaft speed is permitted whenever its respective drive plate, rotating at a speed faster than the housing, advances a trailing wedge element of a pair out of engagement with the housing engagement areas by compressing the corresponding spring between such pair of elements. Such free-wheeling does not affect drive engagement of the other drive plate, which continues to be driven so long as it is rotating at the same or a slower speed than the housing because a wedge member longitudinally aligned with such other drive plate continues to transfer rotational drive power thereto from the housing.

13 Claims, 3 Drawing Sheets

HIGH SPEED DIFFERENTIAL UNIT

BACKGROUND OF THE INVENTION

The present invention generally concerns an improved differential drive, and more particularly relates to a positive traction differential unit differentially transferring rotational forces from a central housing to drivable shafts extending from either side thereof. The present invention is particularly adapted for performance at relative high speed operation, and is reversible.

Differential transmission units, generally for allowing a common rotational input to be differentially transferred between two axle shafts, have long been in existence. For example, in one type of differential transmission unit such as sometimes used in a rear wheel drive automobile, when either of the rear driving wheels begin to slip due to loss of traction, driving input from the automobile drive shaft is diverted to that wheel. Effective drive power for moving the vehicle is thus in proportion to the traction of such slipping wheel. In some instances, power delivered from the drive shaft to the non-spinning wheel is insufficient to move the vehicle, because substantially all of the driving power is being diverted to the slipping wheel. Thus, the vehicle may become immobilized due to the lack of traction of the spinning wheel. Even though the non-slipping wheel may have sufficient traction, it never receives sufficient rotational input for mobilizing the vehicle.

Some prior differential units are generally shown by the following U.S. Pat. Nos. 3,130,604 by Johnson et al.; 2,841,036, by Decker; 1,282,614, by Miller; 1,238,659, by Ford; and 1,162,754, by Deegan.

Some other types of differential transmission units may be locked, either manually or automatically, for transmitting rotational drive power from a drive shaft to a pair of drive axles so that wheels mounted thereon deliver driving torque to a road surface, even if one of the wheels tends to slip or spin. Such differential transmission units are commonly referred to as limited slip or positive traction differential units. Such locking may be variously accomplished. For example, U.S. Pat. No. 2,967,438, granted to Altmann, and U.S. Pat. No. 2,938,407, granted to Nallinger et al., each generally prevent a slipping wheel from receiving all of the driving input from a drive shaft, by variously diverting some power from the driving shaft to the axle connected to the other, i.e., non-slipping, wheel. The Altmann and Nallinger units generally use ball-like members which selectively engage different members during operation.

U.S. Pat. No. 1,823,092 granted to De Lavaud relates to a differential unit with unitary rollers carried by two respective hubs. The rollers extend into grooves in a surrounding sleeve. As such sleeve rotates, portions of the grooves are brought into contact with the unitary rollers which, in turn, frictionally engage their respective hub to turn an output shaft uniquely associated therewith. During a vehicle turn, an "outer" wheel normally rotates faster than an "inner", positively engaged wheel. The hub corresponding to such outer wheel rotates a limited amount relative to the still-engaged hub, which brings such roller to a central, intermediate area of the groove, thereby releasing any frictional engagement between the free-wheeling output shaft and the surrounding sleeve. Numerous parts, subject to large, changing forces, are needed for allowing such relative rotation between the respective hubs on which the unitary rollers are independently carried, all of which is required to achieve the De Lavaud differential action.

SUMMARY OF THE INVENTION

The present invention recognize and addresses various drawbacks of prior art differential drive units. Thus, it is one general object of the present invention to provide an improved differential drive. One more particular object is to provide a positive traction differential unit for receiving a rotational input and delivering two rotational outputs therefrom, particularly for relatively high rotational speed applications.

Another present object is to provide such an improved differential drive arrangement which receives a rotational input and differentially delivers two rotational outputs therefrom, without use of internal gears, while generally minimizing the complexity of such arrangement so as to increase reliability thereof.

Another object of the present invention is to provide an improved differential unit which is of relatively simple yet rugged design, and which may be used in a wide variety of applications.

Yet another object of the present invention is to provide an improved differential unit which is suitable for use with a four wheel drive all-terrain vehicle, including units located on either one or both the front and rear axles thereof.

Still another object of the present invention is to provide a differential drive arrangement which provides drive wheels of a vehicle with positive traction, whether the vehicle is moving relatively forward or reverse.

Various combinations of present features may be provided as different embodiments of this invention in fulfillment of the foregoing objects and others, without departing from the spirit and scope of this invention. One such exemplary construction is directed to a drive arrangement for differentially powering a pair of drive axles, such drive arrangement comprising: rotatably drivable housing means, adapted for receiving rotating drive power applied thereto for driven rotation of such housing means, and for rotatably receiving at least one end of each respective drive axle, such housing means being generally annular in nature, with an inside diameter defining relatively inwardly-projecting engagement areas; a pair of drive plates, rotatably received within the housing means, and respectively associated therein with the drive axle ends for rotation therewith, such drive plates being longitudinally displaced with respect to one another; and carriage means, comprising an integral annular member disposed respectively between the housing means and each of the drive plates, for supporting thereon at least one pair of engagement means, such pair of engagement means being longitudinally displaced so as to correspond respectively with the longitudinally displaced drive plates, for transferring rotating drive power from the housing means to their corresponding drive plate upon respective contact with the housing means engagement areas; wherein, one of the drive plates may receive drive power transferred thereto via its corresponding engagement means for rotation with the housing means, while the other of the drive plates is rotated by its corresponding drive axle at a rate faster than that of the housing means.

Another exemplary embodiment of this invention relates to a differential drive adapted for relatively high speed operation, comprising: a rotatable housing including an annular member, with an outside diameter adapted for receiving rotating drive force, and an inside diameter defining at least one arcuate section not concentric with such outside diameter, such at least one arcuate section having relatively inwardly projecting engagement areas generally adjacent either end thereof; a pair of rotatably supported drive shafts, extending outwardly from respective, opposite sides of the housing; a generally annular cage, received within the housing and defining at least one pair of circumferential slots therein through the circumference thereof, such slots being laterally displaced from one another; a pair of rotatable drive plates, both received within the cage in respective lateral alignment with the slots thereof, and respectively associated with each of the drive shafts for integrally rotating therewith, each drive plate having an outside diameter adapted for frictional engagement with other elements forced into contact therewith; at least two wedge assemblies, one each being disposed within each of the cage slots and thereby laterally aligned with a respective drive plate, wherein each assembly includes a pair of wedge members with biasing means therebetween for urging same apart, such wedge members each having an inner surface with a radius of curvature for correspondence with the outside diameter of its respective drive plate, and an outer surface adapted for selected contact with the rotatable housing engagement areas; whereby rotating drive force is differentially transferred from the housing to the respective drive shafts whenever the wedge assemblies are respectively contacted by the rotatable housing engagement areas, when rotated at a given speed, so as to be forced into contact and thus frictional engagement with the outside diameter of their respective drive plate rotating at or below such given speed of the housing.

Yet another present construction may include a differential drive arrangement for high speed, reversible operation, comprising: a pair of co-axially aligned and rotatably supported drive axles, such drive axles each including an integral drive plate on respective, relatively adjacent ends thereof; an integral cage assembly, received about both of the drive plates, such cage assembly including a pair of sets of circumferential slots defined through the circumference thereof, such sets being laterally displaced from one another and respectively aligned with one or the other of the drive plates; rotatable housing means, received generally about the integral cage assembly and the drive plates, with the respective drive axles emerging therefrom, the housing means including an external surface adapted for receiving drive power for the controlled rotation of such housing means, and including an internal surface defining engagement cells adapted for alignment over the respective cage assembly slots, such engagement cells having engagement areas for the transference of rotation drive power to the drive plates, and non-engagement areas for corresponding non-transference; and a plurality of wedge means, one each received in each of the cage assembly slots so as to be disposed relatively between the housing means and a respective drive plate, for selectively simultaneously contacting on one side thereof the housing means engagement areas and on an opposite side thereof its respective drive plate to transfer rotation drive power thereto whenever the rotational speed of such respective drive plate is generally equal to or less than that of the housing means; whereby the respective drive axles, when rotating at generally the same or at a slower speed than that of the housing means when rotated, may receive rotation drive power therefrom while also being free to be otherwise respectively rotated faster than the housing means without any driving connection thereto.

Those of ordinary skill in the art will appreciate various modifications and variations to such embodiments, such as the substitution of equivalent features and means, or the reversal of various members thereof, which may be practiced without departing from the spirit and scope of this invention. All such variations are intended to come within this invention, by virtue of present reference thereto. Moreover, those of ordinary skill are expected to make such types of variations in the ordinary course of practicing the present invention in various applications of their own choosing, which also come within the invention, as well.

BRIEF DESCRIPTION OF THE DRAWINGS

A full and enabling disclosure of the present invention directed to those of ordinary skill in the art, including the best mode thereof, follows hereinafter together, with reference to the accompanying drawings, in which.

Figure 1:
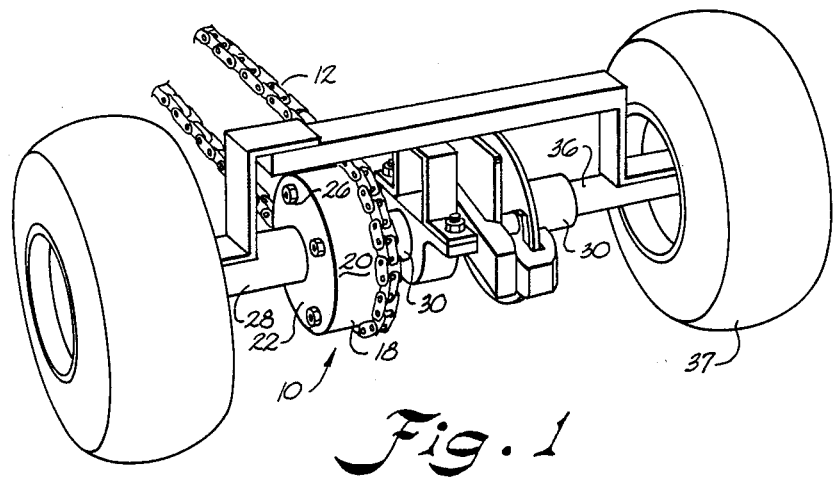
FIG. 1 is a perspective view of a vehicle axle incorporating an exemplary differential drive arrangement constructed in accordance with the present invention.

Repeat use of reference characters in this specification and the accompanying drawings is intended to represent same or analogous features or aspects of the present invention.

DESCRIPTION OF THE PREFERRED EMBODIMENT

An exemplary positive traction differential unit 10 of the present invention is shown in FIG. 1, as incorporated into an axle of a vehicle such as a cart. Obviously, the present invention may be practiced with different sorts of vehicles including, but not limited to automobiles, trucks, 4×4's, tractors, garden equipment, riding lawn mowers, and the like. A gasoline engine or other power source (not shown) drives a chain 12 which further drives a sprocket 14 (or equivalent driving means) disposed about the outside diameter 16 of a rotatable housing means 18 of differential unit 10. Housing means 18 rotates with chain 12 under rotating drive power from the above-mentioned engine. The sprocket and chain drive arrangement may be substituted with a frictionally engaged drive belt or the like, or other means for effecting rotation of housing means 18. Sprocket 14 may also be longitudinally displaced on selected areas of housing means 18.

Figure 2:
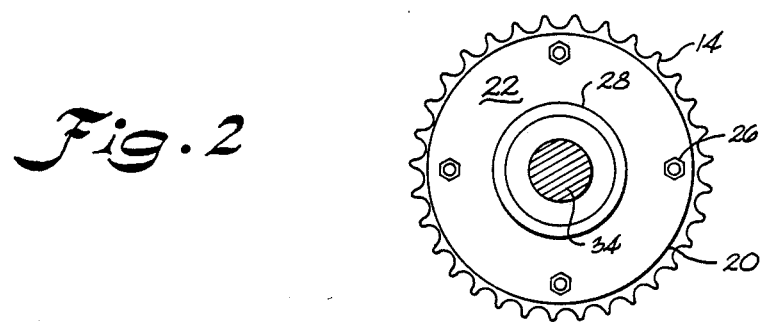
FIG. 2 is a side elevational view of the present differential drive incorporated into FIG. 1.
Figure 3:
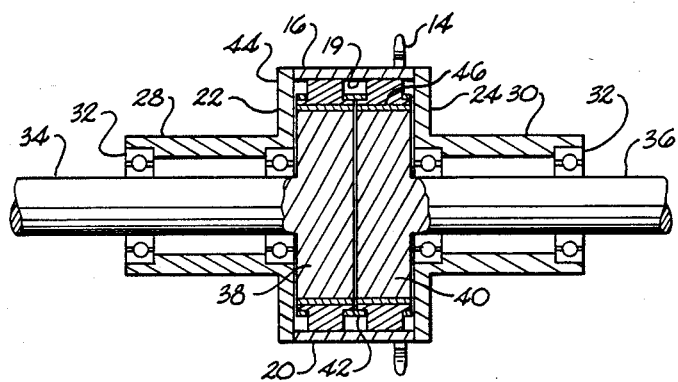
FIG. 3 is a partial, axial sectional view of the differential of present FIG. 1.
Figure 4:
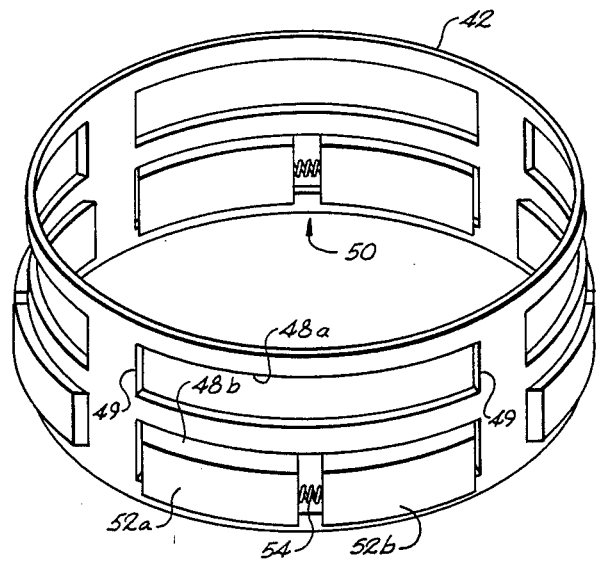
FIG. 4 is a perspective view of exemplary cage assembly and wedge means features constructed in accordance with the present invention, removed from a drive arrangement so as to illustrate greater detail thereof.

As more fully shown in FIGS. 1 through 3, housing means 18 comprises preferably a generally annular central member 20 and two circular side plates 22 and 24 on either side thereof. Annular member 20 includes at least one arcuate section or indentation 21 disposed on the inside diameter 19 thereof as shown, for example, in FIGS. 5 and 6. Further such arcuate sections 23 may be formed successively about the circumference of inside diameter 19, forming relative apex portions 25 at adjacent ends thereof. The practical affect and operation of the annular member 20 inside diameter 19 will be discussed in greater detail below.

Central member 20 may be formed integrally with side plates 22 and 24. Present FIG. 3 represents one such integral assemblage. Alternatively, for ease of assembly, member 20 and side plates 22 and 24 may constitute separate members held together by threaded bolts 26 or any other equivalent means. Present FIGS. 1, 2, 5 and 6 illustrate bolts 26, and represent such alternative housing means construction.

Integral with side plates 22 and 24 are sleeves 28 and 30, which preferably contain rotational bearings 32 for respective receipt of drive axles or shafts 34 and 36. Sprocket 14 may be disposed on central member 20 or either of the side plates so long as it effectively transfers rotational drive power from chain 12 to housing means 18.

As shown in FIG. 3, rotatably mounted axle shafts 34 and 36 preferably extend outwardly from housing means 18 through their respective sleeves. The shafts, rotatably supported by bearings 32, are formed integral with or attached to generally circular drive plates 38 and 40, which are in turn both commonly disposed within annular member 20 of housing means 18. The shafts and drive plates are generally free to rotate relative to housing means 28 due to bearings 32. Preferably, shafts 34 and 36 are co-axially aligned, with their drive plates situated adjacent one another. A vehicle wheel 37 is attached to each shaft for rotation thereby so as to transfer drive torque to the ground. Other propulsion members, such as tank-like tracks, or tandem wheels, may be practiced with the invention in place of the exemplary single wheels 37.

A carriage means, i.e., cage assembly, annularly resides between each respective drive plate and the housing means, for supporting thereon at least a pair of engagement means, which respectively transfer rotational drive power from the housing means to each respective drive plate. Such carriage means includes an integral, generally annular cage 42, as shown in FIGS. 2 through 6, disposed about the outside diameters 44 and 46 respectively of both of the driven plates 38 and 40. At least one pair of circumferential slots 48a and 48b is defined through the circumference of cage 42. The slots 48a and 48b are preferably identical and disposed parallel to one another and mutually laterally displaced for alignment with respective of the drive plates. Further, the slots are preferably side-by-side, though the invention could operate with circumferentially displaced slots, with other corresponding variations. The number of pairs of slots preferably equal the number of arcuate sections 21, 23, and the like in annular member 20. Such arcuate sections also preferably align over (i.e., reside generally axially outward from) such slots so as to form engagement cells with respect thereto, as discussed below in detail.

Each cage slot is adapted to receive and support one wedge assembly 50 (i.e., engagement means), preferably comprising two wedge members 52a and 52b held together by a spring 54 normally under compression. Spring 54 urges the wedge members apart and into contact with the respective slot ends 49. The inner, or concave, surface 56 of each wedge member is arcuate, with a radius of curvature generally corresponding with that of the outside diameter of its respective drive plate. Surface 56 may be textured for increased (i.e., enhanced) frictional interaction with a drive plate. Alternatively, the drive plate outside diameters may be textured for the same purpose, in place of texturizing on surfaces 56, or in addition thereto. The outer, or convex, surface 58 of each wedge is also arcuate, but generally with a radius of curvature different from that of the arcuate sections or indentations 21 in annular member 20, for selected interfering engagement therewith, as discussed below.

Operation of the present engagement means is generally as follows. For the sake of clarity, the interaction of only one wedge assembly 50, drive plate, and arcuate section will be discussed. Of course, it is to be understood that there may be a number of such wedge assemblies, formed as assembly 50, and disposed about drive plate 38 (represented in present FIG. 4 as preferably four assemblies) mutually equi-spaced, and disposed about drive plate 40 (which functions generally the same as plate 38).

During straight line travel of a vehicle incorporating the present invention, both wheels of the vehicle (such as wheels 37; present FIG. 1) rotate under driving force at substantially the same speed. A motor actuates chain 12 which rotates sprocket 14, and thus housing means 18. As housing means 18 begins to rotate (shown as clockwise arrow 60 in FIG. 5), it rotates relative drive plate 38, cage 42, and wedge assembly 50 until an engagement area 62 of arcuate section (i.e., engagement cell) 21 contacts relatively trailing wedge 52a. Such engagement area generally comprises an inwardly-projecting portion of inside diameter 19, relatively adjacent an apex portion 25, which projects inwardly an amount adequate for interference with engagement wedges or the like passed therebeneath. If such wedges are maintained relatively between adjacent of such engagement areas, i.e., in relative non-engagement areas 63 of each engagement cell, then there is no transfer of rotation drive power from the housing means through such wedges to their corresponding drive plate.

However, whenever contact between an engagement area 62 and the convex surface 58 of wedge 52a forces the inner surface 56 of such wedge 52a against the drive plate outside diameter 44, it thus frictionally engages the corresponding drive plate 38 for rotation thereof at the speed of housing means 18 (assuming no slippage between engaged wedge 52a and drive plate 38). Where there are plural slots and wedges aligned with a given drive plate, it is preferred that each arcuate section 21 contact the wedge respectively axially-inward therefrom, thus uniformly distributing the rotation drive force about drive plate 38.

Figure 5:
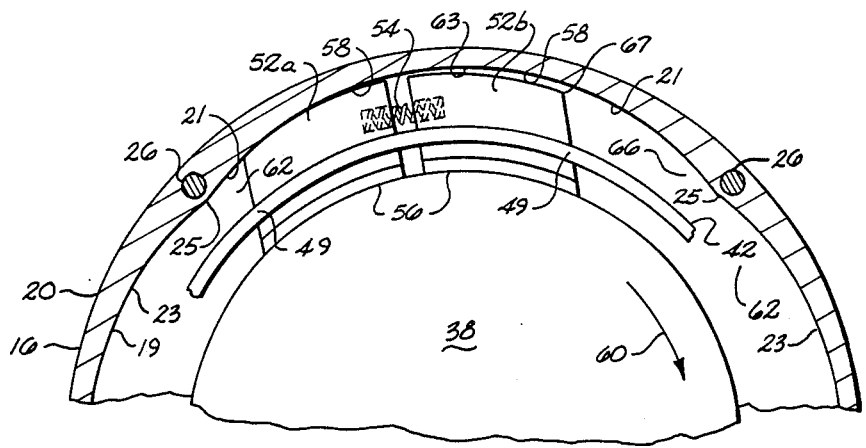

FIG. 5 depicts paired wedges 52a and 52b disposed extended mutually axially outward by spring 54 so as to contact the respective ends 49 (shown in dotted line) of an exemplary slot 48. Drive plate 38 is rotationally engaged, since one side (surface 56) of wedge member 52a is (under forced contact) frictionally engaged therewith, while simultaneously the other side (surface 58) of wedge member 52a is in interference engagement with an engagement area 62 of housing means 18. The slot ends are defined through the circumference of annular cage 42 at an angle; thus, the disengaged wedge 52b is securely positioned within the slot 48 and prevented from contacting any engagement areas of arcuate section 21.

Spring 54 biases wedge 52b (which resides in relative non-engagement area 63) against the relatively leading end 49 (given the direction of rotation of arrow 60) of slot 48, thereby preventing (i.e., stopping) movement of wedge 52b toward an engagement area 62, while retaining wedge 52b in contact with the drive plate 38. Where more than a pair of slots and corresponding wedge assemblies are used, they are similarly disposed (as FIG. 5) relative to arcuate sections 21 and drive plates 38 and 40 during vehicle straight line travel.

Operation of differential unit 10 in "reverse" direction is exactly opposite to "forward" operation due to symmetry of construction. For example, if housing means 18 were instead rotated counter-clockwise (i.e., opposite to the direction of arrow 60) by chain 12, housing means 18 would correspondingly be rotated counter-clockwise relative to drive plate 38, cage 42 and any wedge assemblies 50 until an engagement area 62 contacted the opposite wedge 52b. In other words, with reference to FIG. 5, edge 64 of wedge 52b would then be a relatively trailing edge of the wedge means, and would come into interfering engagement with such engagement area 66 as annular member 20 was rotated in a direction opposite to that of arrow 60. For such "reverse" operation, wedge 52b transmits force to drive plate 38 through a frictional engagement therewith, just as for "forward" operation. Similarly, spring 54 biases wedge 52a against the then relatively leading slot end 49 adjacent thereto and in contact with drive plate 38 (but not an engagement area 62).

While the above is generally a description, intended for one of ordinary skill in the art, of the differential unit operation whenever the vehicle with which it is practiced travels substantially in a straight line (in selected "forward" or "reverse" directions), curved travel of such a vehicle actually gives rise to the need for differential operation. As well known, during travel around a curve, the "outside" wheel of a given wheel pair must rotate faster than the "inside" wheel of such pair in order to travel the greater distance involved to complete the curved travel of the vehicle.

With the present invention, during such curved vehicle travel, the "inner" wheel of the wheel pair remains engaged (i.e., rotatably driven) in that each wedge 52a (per the exemplary illustration of FIG. 5) remains locked between an engagement area 62 and the corresponding drive plate associated with such inner wheel, generally due to the operation already described above. The "outer" wheel (in this hypothetical, the one associated with drive plate 40 and drive axle shaft 36) must rotate at a rate faster than the inner wheel associated with drive plate 38 and drive axle shaft 34, and therefore faster than the housing means 18 and annular integral cage 42. With the present invention, differential action is obtained generally because integral cage 42 (simultaneously surrounding both drive plates 38 and 40, but supporting thereon respective engagement means for each such drive plate) is prevented from rotation relative to housing means 18 due to the locked or engaged condition of wedge 52a which is associated with the "inner" drive plate 38.

The following discussion of differential drive operation of the present invention proceeds with plate 38 viewed as the locked or engaged plate and plate 40 as the relatively faster rotating plate, for purposes of illustration only. It is to be understood that differential drive action directed to either drive plate is possible, depending on the direction of curved travel by the associated vehicle.

Figure 6:
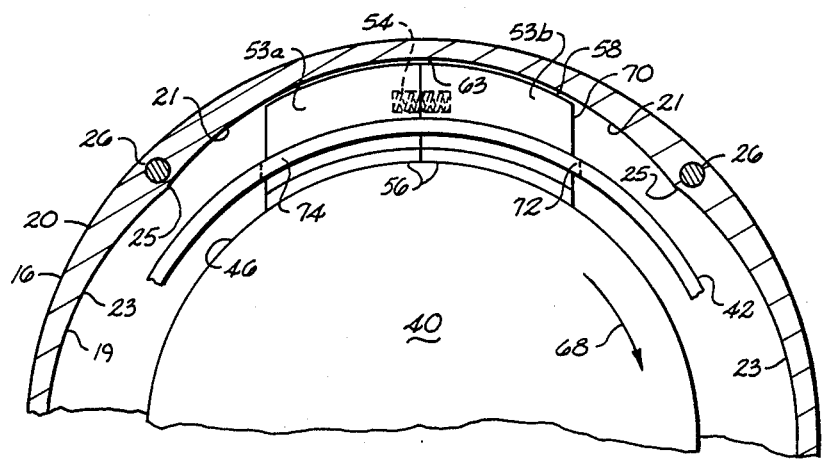
FIGS. 5 and 6 are partial, sectional end views of a differential drive arrangement of this invention in drive engagement and dis-engagement (i.e., free-wheeling), respectively.

Drive plate 40 (as illustrated in FIG. 6) is integrally connected through a drive shaft with the assumed "outer" vehicle wheel during curved vehicle travel and therefore is rotated faster than housing means 18 and integral cage 42 during such turn. As drive plate 40 is rotated by movement relative to integral cage 42 (due to such relatively faster rotation) initially complete frictional engagement between inner surface 56 of each wedge 53a and drive plate 40 moves wedge 53a clockwise (in the direction of arrow 68, the assumed rotation direction of the drive plate 40 and housing means 18), which compresses spring 54. As earlier stated, such spring compression permits the wedge assembly comprising wedge members 53a and 53b to take up less space in its corresponding slot than the entire arcuate length of such slot. Thus, both wedges 53a and 53b associated with drive plate 40 are thereby positioned so as to avoid engagement with any engagement areas 62. Once relatively leading edge 70 of wedge 53b stops against edge 72 of cage slot 74, the initially complete frictional engagement between surfaces 56 of wedge members 53a and 53b is broken relative drive plate 40 outside diameter 46, and the drive plate 40 is free to rotate relative to housing means 18, integral cage 42, and "inner" drive plate 38. Thereafter, partial frictional engagement between surfaces 56 and drive plate 40 outside diameter 46 contributes to continued compression of spring 54, so that wedges 53a and 53b continue to reside in a relatively non-engagement area 63.

When the turn is completed and straight line travel of the vehicle commences again, drive plate 40 again rotates at the speed of the drive plate 38. Since drive plate 40 ceases to be advanced relative integral cage 42 and wedges 53a and 53b, spring 54 forces wedge 53a to return from the position thereof relative to housing means 18 depicted in FIG. 6 to the relative position depicted in FIG. 5 concerning wedge 52a. Thus, wedge 53a, like wedge 52a of FIG. 5, will again become engaged between an engagement area 62 and the drive plate 40 for imparting rotation drive force to the corresponding drive axle of plate 40.

The foregoing description of the interaction between wedge pairs, corresponding springs, drive plates, the integral cage 42, and the housing means 18 is intended to describe generally the operation of a differential drive arrangement in accordance with the invention during differential drive operation, such as during a vehicle turn, as well as alternative straight line operation. The typical travel of a vehicle involves numerous turns and therefore requires frequent shifting by differential unit 10 to transfer driving force back and forth between the wheels 37 as necessary. All differential operations required for such vehicle movements are provided by drive devices in accordance with this invention. Thus, during normally anticipated use, the wedge assembly pairs are frequently "compressed" back and forth between the alternate positions represented in FIGS. 5 and 6. However, drive arrangements in accordance with the present invention advantageously minimize the number of moving parts involved with differential operations, and thus provide a relatively rugged, and reliable drive for reversible, positive traction differential driving.

Due to symmetry of the present exemplary construction, it is to be understood that, depending on the direction of the vehicle's travel and/or turning, either of the two drive plates 38, 40 may at times constitute the faster moving of the two plates, with the drive functioning generally as described above. Alternatively, a differential of this invention may be used in between front and rear axles in conjunction with a transfer case. Variations and modifications to the invention other than the construction illustrated are intended to come within the spirit and scope of this invention, which is also described in the appended claims.

What is claimed is:

1. A drive arrangement for differentially powering a pair of drive axles, said drive arrangement comprising:
   rotatably drivable housing means, adapted for receiving rotating drive power applied thereto for driven rotation of said housing means, and for rotatably receiving at least one end of each respective drive axle, said housing means being generally annular in nature, with an inside diameter defining relatively inwardly-projecting engagement areas;
   a pair of drive plates, rotatably received within said housing means, and respectively associated therein with the drive axle ends for rotation therewith, said drive plates being longitudinally displaced with respect to one another; and
   carriage means, comprising an integral annular member disposed respectively between said housing means and each of said drive plates, for supporting thereon at least one pair of engagement means, said pair of engagement means being longitudinally displaced so as to correspond respectively with said longitudinally displaced drive plates, for transferring rotating drive power from said housing means to their corresponding drive plate upon respective contact with said housing means engagement areas; wherein
   one of said drive plates may receive drive power transferred thereto via its corresponding engagement means for rotation with said housing means, while the other of said drive plates is rotated by its corresponding drive axle at a rate faster than that of said housing means;
   said carriage means annular member includes a plurality of circumferential slots defined through the circumference thereof for receiving therein said engagement means in respective of such slots;
   said pair of engagement means each comprise a pair of curved wedge members journaled respectively in one of said slots for limited circumferential movement therein, joined together with a spring; and
   said wedge members have a concave surface forming a curvature adapted for concentric mating and frictional engagement with the outside diameter of its respective drive plate, and further have a convex surface forming a curvature adapted for interfering engagement with said housing means inwardly-projecting engagement areas, whereby rotating drive power applied to said housing means may be transmitted to a respective drive plate via simultaneous interfering engagement by one of its corresponding wedge members with an engagement area and frictional engagement of such one wedge member with such respective drive plate.

2. A drive arrangement as in claim 1, wherein:
   said housing means includes a generally circular member having an outer diameter with a sprocket mounted thereabout adapted for engagement with a chain drive to receive rotating drive power therefrom; and wherein said inside diameter engagement areas comprise a plurality of arcuate sections which are non-concentric with said outer diameter of said generally circular member, so that adjoining relative apex portions of adjacent arcuate sections define said relatively inwardly-projecting engagement areas.

3. A drive arrangement as in claim 1, wherein the arcuate length of a given slot is longer than the pair of wedge members journaled therein whenever the spring joining such members is compressed, whereby such wedge members may be positioned within such slot during compression of their respective spring so as to avoid engagement with any of the housing means inwardly-projecting engagement areas, such that their respective drive plate will be free to be rotated by its corresponding drive axle at a rate faster than that of said housing means, and during which period of faster rotation, frictional engagement is overcome between the concave surfaces of such wedge members and their respective drive plate outer diameter.

4. A drive arrangement as in claim 2, wherein said housing means further includes respective opposing circular end plates, captured against axial ends of said generally circular member for enclosing same, such end plates including integral therewith respective bearing assemblies for rotatably receiving and supporting the respective drive axle ends.

5. A differential drive adapted for relatively high speed operation, comprising:
   a rotatable housing including an annular member, with an outside diameter adapted for receiving rotating drive force, and an inside diameter defining at least one arcuate section not concentric with said outside diameter, said at least one arcuate section having relatively inwardly projecting engagement areas generally adjacent either end thereof;
   a pair of rotatably supported drive shafts, extending outwardly from respective, opposite sides of said housing;
   a generally annular cage, received within said housing and defining at least one pair of circumferential slots being laterally displaced from one another;
   a pair of rotatable drive plates, both received within said cage in respective lateral alignment with said slots thereof, and respectively associated with each of said drive shaft for integrally rotating therewith, each drive plate having an outside diameter adapted for frictional engagement with other elements forced into contact therewith; and
   at least two wedge assemblies, one each being disposed within each of said cage slots and thereby laterally aligned with a respective drive plate, wherein each assembly includes a pair of wedge members with biasing means therebetween for urging same apart, said wedge members each having an inner surface with a radius of curvature for correspondence with the outside diameter of its respective drive plate, and an outer surface adapted for selected contact with said rotatable housing engagement areas;
   whereby rotating drive force is differentially transferred from said housing to said respective drive shafts whenever said wedge assemblies are respectively contacted by said rotatable housing engagement areas, when rotated at a given speed, so as to be forced into contact and thus frictional engagement with the outside diameter of their respective drive plate rotating at or below such given speed of said housing; and wherein at least one of said inner surfaces of said wedge members and its respective drive plate outside diameters are textured for enhanced frictional engagement upon forced contact therebetween.

6. A differential drive as in claim 5, wherein:

said housing annular member includes a plurality of said arcuate sections circumferentially spaced about said inside diameter thereof, with ends of adjacent such sections defining relative apex portions of said inside diameter; and said generally annular cage defines two sets of said slots laterally spaced thereon, with each set including a plurality of such slots circumferentially spaced thereabout in respective side-by-side arrangement with the adjacent set, and with each of said slots including one of said wedge assemblies disposed therein.

7. A differential drive as in claim 5, wherein said inner surfaces of said wedge members are textured for enhanced frictional engagement upon forced contact with its respective drive plate outside diameter.

8. A differential drive as in claim 5, wherein said outside diameters of said drive plates are textured for enhanced frictional engagement upon forced contact with its respective wedge member inner surfaces.

9. A differential drive as in claim 5, wherein said housing further includes side plates secured to said annular member, and sleeves integral with said side plates, said sleeves being disposed about said respective drive shafts for rotatably receiving same.

10. A differential drive as in claim 5, wherein said housing includes a sprocket disposed about said annular member outside diameter, said sprocket adapted to be driven by a chain which in turn is entrained with a motor output for receiving rotating drive power therefrom.

11. A differential drive as in claim 9, further including rotatable bearings disposed within said sleeves for respectively supporting said drive shafts.

12. A differential drive arrangement for high speed, reversible operation, comprising:

a pair of co-axially aligned and rotatably supported drive axles, said drive axles each including an integral drive plate on respective, relatively adjacent ends thereof;

an integral cage assembly, received about both of said drive plates, said cage assembly including a pair of sets of circumferential slots defined through the circumference thereof, said sets being laterally displaced from one another and respectively aligned with one or the other of said rive plates;

rotatable housing means, received generally about said integral cage assembly and said drive plates, with said respective drive axles emerging therefrom, said housing means including an external surface adapted for receiving drive power for the controlled rotation of said housing means, and including an internal surface defining engagement cells adapted for alignment over said respective cage assembly slots, said engagement cells having engagement areas for the transference of rotation drive power to said drive plates, and non-engagement areas for corresponding non-transference; and a plurality of wedge means, one each received in each of said cage assembly slots so as to be disposed relatively between said housing means and a respective drive plate, for selectively simultaneously contacting on one side thereof said housing means engagement areas and on an opposite side thereof its respective drive plate to transfer rotation drive power thereto whenever the rotational speed of such respective drive plate is generally equal to or less than that of said housing means;

whereby the respective drive axles, when rotating at generally the same or at a slower speed than that of said housing means when rotated, may receive rotation drive power therefrom while also being free to be otherwise respectively rotated faster than said housing means without any driving connection thereto; and wherein said plurality of wedge means each comprise a pair of arcuate wedge members journaled in their respective cage assembly slot, joined by a repelling force spring, for engaging housing means engagement areas at alternate ends thereof responsive to corresponding alternate directions of rotation of said housing means relative to said drive plates so as to impart corresponding direction rotation drive power to such drive plates, whereby said differential drive arrangement is operable for selectively reversibly driving rotation of said drive axles;

said repelling force spring at rest causes its corresponding wedge members to occupy the full arcuate length of their corresponding cage assembly slot, while relative compression of such spring causes the corresponding wedge members to occupy less than the total arcuate length of such slot which avoids contact of such wedge members with housing means engagement areas axially outward therefrom;

such compression occurs respectively for each repelling force spring whenever the corresponding drive plate axially inward therebeneath begins to turn faster than the housing means axially outward therefrom while the other drive plate continues to receive rotation drive power from said housing means; and such spring compression includes relative advancement of a relatively trailing one of a pair of said wedge members while the relatively leading one of such pair is captured against a relatively forward edge of its corresponding cage assembly slot, such trailing member advancement occurring due to frictional engagement between a lower arcuate surface of such trailing wedge member and the outer diameter of its corresponding drive plate, with said cage assembly being held in relative fixed position relative the other of said drive plates in said housing means by continues engagement of another of said wedge means between such other drive plate and said housing means.

13. A differential drive arrangement as in claim 12, wherein:

a set of said circumferential slots includes four such slots spaced generally equidistantly about the circumference of said cage assembly; and wherein said plurality of wedge means correspond in number to the total number of cage assembly slots.

* * * * *